United States Patent [19]
Fan et al.

[11] Patent Number: 4,959,432
[45] Date of Patent: Sep. 25, 1990

[54] ACID VISCOSIFIER COMPOSITIONS

[75] Inventors: You-Ling Fan, East Brunswick; George L. Brode, Bridgewater; James P. Stanley, Bound Brook, all of N.J.

[73] Assignee: Union Carbide Chemicals and Plastics Company Inc., Danbury, Conn.

[21] Appl. No.: 220,784

[22] Filed: Jul. 18, 1988

Related U.S. Application Data

[63] Continuation of Ser. No. 864,204, May 19, 1986, abandoned.

[51] Int. Cl.$^5$ .................... C08F 220/34; C08F 220/60
[52] U.S. Cl. .................................. 526/287; 526/292.2; 526/292.95
[58] Field of Search ................ 526/287, 292.2, 292.95, 526/307; 525/379, 328.2

[56] References Cited

U.S. PATENT DOCUMENTS

| | | | |
|---|---|---|---|
| 3,943,996 | 3/1976 | Guibault et al. | 166/293 |
| 4,022,731 | 5/1977 | Schmitt | 524/166 |
| 4,075,183 | 2/1978 | Kawakami | 526/307 |
| 4,115,339 | 9/1978 | Restaino | 526/312 |
| 4,163,092 | 7/1979 | Steckler | 526/292.2 |
| 4,191,657 | 3/1980 | Swanson | 252/8.55 C |
| 4,444,955 | 4/1984 | Mels | 525/124 |
| 4,452,940 | 6/1984 | Chu et al. | 524/801 |
| 4,529,782 | 7/1985 | Fan et al. | 526/240 |
| 4,563,497 | 1/1986 | Masanck | 524/732 |
| 4,617,362 | 10/1986 | Becker | 526/209 |
| 4,621,120 | 11/1986 | Hollister | 525/327.1 |

FOREIGN PATENT DOCUMENTS 1133788 10/1982 Canada .
0122073 10/1984 European Pat. Off. .

Primary Examiner—Christopher Henderson
Attorney, Agent, or Firm—Henry H. Gibson

[57] ABSTRACT

Cationic, anionic and amphoteric polymers suitable for the preparation of acid viscosifier compositions and the acid viscosified compositions are provided. The polymers are water soluble or water dispersible and are based on acrylyl monomers having the stated ionic charge. They are capable of viscosifying acid solutions that have important use in recovery of gas and oil from subterranean formations.

7 Claims, No Drawings

ACID VISCOSIFIER COMPOSITIONS

This application is a continuation of prior U.S. application Ser. No. 864,204 filed May 19, 1986, now abandoned.

The use of polymeric compositions to thicken or viscosify acid compositions is well known and commonly practiced in the gas and oil recovery field. Though many polymers are used, problems are often encountered, e.g., loss of viscosity of the acid composition, precipitation of the polymer from solution, degradation resulting from exposure to elevated temperatures in the subterranean formation, and sensitivity to calcium ions. The polymers of this invention have been found to alleviate some of the problems.

Canadian Patent No. 1,133,788, issued to K. G. Phillips et al., on Oct. 19, 1982, discloses water-in-oil emulsions of MAPTAC and acrylamide cationic polymers but does not disclose their use as acid viscosifying agents.

U.S. Pat. No. 3,943,966, issued to L. J. Guildbault on Mar. 16, 1976, discloses use of MAPTAC-containing polymers in cements.

U.S. Pat. No. 4,022,731, issued to J. M. Schmitt on May 10, 1977, discloses MAPTAC-AM polymers but does not disclose use as an acid viscosifying agent.

U.S. Pat. No. 4,191,657, issued to B. L. Swanson on Mar. 4, 1980, discloses the use of water dispersible polymers based on acrylamide or methacrylamide, the hydrolyzed polymers thereof, the crosslinked polymers thereof, the hydrolyzed crosslinked polymers thereof, and copolymers thereof with other monomers, in the production of acid compositions suitable for matrix-acidizing or fracture-acidizing subterranean formations. However, it nowhere discloses our claimed polymers.

U.S. Pat. No. 4,452,940, issued to M. R. Rosen on June 5, 1984 and U.S. Pat. No. 4,529,782, issued to Y. L. Fan et al. on July 16, 1985, disclose the producton of water-in-oil emulsions and water soluble polymers. However, they do not disclose the polymers of this invention nor their use in producing viscosified acid compositions.

European patent application No. 0122073, published on Oct. 17, 1984, discloses a terpolymer of acrylamide/-sodium styrene sulfonate/methacrylamidopropyltrimethylammonium chloride and its use in drilling muds having a basic pH of about 10 to 10.5. Not only are the polymers different than those of this invention, but it is not concerned with highly acidic viscosified acid compositions.

The cationic, anionic and amphoteric polymers of this invention are essentially water soluble and can be used to prepare viscosified acid compositions having improved properties.

THE INVENTION

This invention is directed to polymers useful as viscosifying agents to thicken acid solutions that are employed in gas and oil well acidizing operations. The polymers are those cationic polymers (Group A), anionic polymers (Group B) and amphoteric polymers (Group C) hereinafter defined.

Acid treating or acidizing of porous subterranean formations is an accepted procedure for increasing the yield and/or production of fluids from the well, be they liquid or gaseous. These procedures are so well known and so extensively practiced that detailed explanation is neither necessary nor of assistance to one of ordinary skill in this field. Suffice it to say it is an internationally practiced procedure to acid treat wells and the patent and related published technical literature is replete with material detailing the procedure.

Though there is an abundance of published material and commercial compositions available, the industry is continuously looking for improvements. Among the problems that still exist are inadequate penetration of the acid into the formation, fluid loss in the more porous zones of the formation and leak-off at the fracture faces, any one of which may have a deleterious effect on the well's production. Among the attempts that have been made to resolve some of these problems has been the addition of various polymeric thickening agents. These agents seem to thicken the acid solution and increase its viscosity and in many instances the higher viscosity or thickened acid solutions have reduced fluid loss properties. In this regard attention is directed to U.S. Pat. No. 3,415,319 (B. L. Gibson) and U.S. Pat. No. 3,434,971 (B. L. Atkins). It has also been indicated that these thickened acid solutions show a lesser reaction rate with the acid-soluble portions of the formation. In this regard attention is directed to U.S. Pat. No. 3,749,169 (J. F. Tate), U.S. Pat. No. 3,236,305 (C. F. Parks) and U.S. Pat. No. 3,252,904 (N. F. Carpenter).

The higher viscosities additionally have an advantage in fracture-acidizing operations because these thicker and more viscous acid solutions produce longer and wider fractures. They are also more effective in carring propping agents into the formation when they are employed.

A problem existing in acidizing operations is the instability of the viscosifier in the acid solution to heat. This problem can be particularly troublesome when using acidizing solutions that contain thickening or viscosifying agents. Stability to heat, the retention of the increased or higher viscosity properties of the acidizing mixture under the conditions existing in the well or formation is important. The most satisfactory acidizing mixtures or compositions are those which are sufficiently stable to resist degradation by the heat in the well and, particularly, in the formation for a period of time sufficient to accomplish the intended purposes of good penetration and/or significant etching of the formation. The degree of stability will vary from one formation to another, as is known, and is dependent on many factors present during the operation. For instance the size and depth of the well, the type of subterranean formation present, the concentration of the acid in the acidizing solution, the temperature conditions existing throughout the well bore and the formation, etc. All of these factors as well as many others are known to affect the stability of the acidizing solution with the temperature, which can be as high as 400° F. or more, having a pronounced effect and is considered one of the most important operating variables when considering stability. Increased temperature not only hastens degradation with resultant decrease in viscosity but also increases the rate of reaction of the acid in the formation resulting in treatment of a smaller area of the formation; both being undesireable. Thermal degradation must be distinguished from loss of viscosity (thermal thinning) due to increased temperature, also a common phenomenon.

The present invention generally alleviates several of the problems discussed and provides polymers useful for the production of thickened or viscosified acid solutions, and new thickened or viscosified acid solutions containing said polymers.

The following glossary is presented to facilitate an understanding of the designations used to identify the various compounds:

MAPTAC—methacrylamidopropyltrimethylammonium chloride
MAPDMOAC—methacrylamidopropyldimethyl-n-octylammonium chloride
MAPDMDAC—methacrylamidopropyldimethyl-n-dodecylammonium chloride
MAPDMCAC—methacrylylamidopropyldimethylcetylammonium chloride
AM—acrylamide
MAM—methacrylamide
NAM—N-methylacrylamide
NNDMAM—N,N-dimethylacrylamide
DMAPA—dimethylaminopropylmethacrylamide
NaAMPS®—sodium 2-acrylamido-2-methylpropane sulfonate
NPPEM—nonylphenoxypoly(ethyleneoxy)ethylmethacrylate
DMDAAC—dimethyldiallylammonium chloride
SPP—N-(3-sulfopropyl)-N-methacrylamidopropylN,N-dimethyl ammonium betain
VAZO 33 ®—2,2'-azobis(2,4-dimethyl-4-methoxy valeronitrile)
VAZO 52 ®—2,2'-azobis(2,4-dimethyl valeronitrile)
TERGITOL NP10 ®—10 mole ethoxylate of nonylphenol
VERSONEX 80 ®—pentasodium salt of diethylenetriamine pentaacetic acid
Santonox R ®—a phenolic thioether
Ionol ®—di-t-butyl-p-cresol
Isopar M ®—hydrocarbon oil

The Group A Cationic Polymers

The Group A cationic polymers are the polymers presented by Generic Formula A. They are produced by polymerizing monomer (i) alone or in combination with one or more of the monomers (ii), (iii) and/or (iv):
(i) an acrylamidoalkyltrialkylammonium halide or a methacrylamidoalkyltrialkylammonium halide;
(ii) acrylamide, an N-alkylacrylamide or an N,N-dialkylacrylamide;
(iii) a hydrophobic acrylamidoalkyltriammonium halide or methacrylamidoalkyltrialkylammonium halide different than that which was used as monomer (i); as (iii) is defined in Generic Formula A; and
(iv) a polyunsaturated monomer.

The cationic polymers of this group appear to perform well in the laboratory under acidizing conditions usually encountered in the field. They exhibit good solubility and stability in acid solutions at only moderate cationic levels, they exhibit good viscosity retention after thermal aging in acid, they are capable of forming very high molecular weight polymers thus giving rise to high viscosifying efficiencies, the polymers containing the polyunsaturated monomer modifier in the molecule often exhibit improved thermal thinning behavior over the corresponding unmodified versions, and they are compatible with other cationic additives generally used in the field. Those containing the hydrophobe (iii) and/or polyunsaturated monomer (iv) are novel polymers.

GENERIC FORMULA A

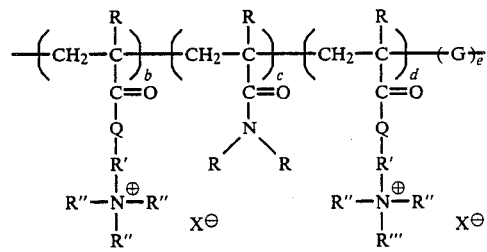

where
R = H or CH$^3$;
R' = a linear or branched alkylene radical having from 2 to 10 carbon atoms, preferably from 2 to 6 carbon atoms, most preferably from 2 to 4 carbon atoms;
R'' = H or alkyl, linear or branched, having from 1 to 3 carbon atoms, preferably from 1 to 2 carbon atoms;
R''' = an alkyl group, linear or branched, having about 4 to about 25 carbon atoms, preferably from 4 to 18 carbon atoms; aryl, alkaryl or aralkyl having from 6 to 18 carbon atoms;
Q = —NR— or —O—;
G 32 a residual unit derived from a polyunsaturated monomer;
X$^\ominus$ = a halogen ion (F, Cl, Br, I) or a methyl sulfate ion;
b = from about 10 to 100 mole percent, preferably from 20 to 50 mole percent, most preferably from 30 to 50 mole percent; with the proviso that (b) is not more than 99.90% when (d) is greater than zero
c = from about 0 to 90 mole percent, preferably from 50 to 80 mole percent, most preferably from 50 to 70 mole percent;
d = from 0 to about 10 mole percent, preferably from 0.1 to about 2 mole percent; and
e = from 0 to 2 mole percent, preferably from 0 to 0.5 mole percent.

Illustrative type (i) water-soluble monomers include methacrylamidopropyltrimethylammonium chloride, methacrylamidopropyltrimethylammonium methylsulfate, methacrylamidopropylhydroxyethyldimethylammonium acetate, methacrylamidopropylisopropylammonium chloride, methacryloylethyltrimethylammonium chloride, acryloylethyltrimethylammonium chloride, methacryloylethyltrimethylammonium methylsulfate, acrylolethyldimethylethylammonium ethylsulfate and the like.

Illustrative type (ii) monomers include acrylamide, N-methylacrylamide and dimethylacrylamide, alpha-methyl acrylamide, alpha-methyl-N-methylacrylamide, alpha-methyl-N,N-dimethylacryl-amide.

Illustrative type (iii) hydrophobic monomers include methacrylamidopropyldimethyl-n-octylammonium chloride, methacrylamido-propyldimethyl-n-dodecyl ammonium chloride, methacrylamidopropyldimethyl cetylammonium chloride, methacryoylethyldimethyloctylammonium chloride, methacryloylethyldimethylcetylammonium chloride, acryloylethyldimethyldodecylammonium chloride, acryloylethyldimethyloctylammonium chloride, methacrylamidopropyldimethylhexylammonium chloride, methacryloylethyldimethylstearylammonium chloride and the like.

Illustrative type (iv) monomers include ethylene glycol diacrylate, diethylene glycol diacrylate, propylene glycol diacrylate, ethylene glycol dimethacrylate, diethylene glycol dimethacrylate, diurethane dimethacrylate, 1,4-butandiol dimethacrylate, polyglycol-400 dimethacrylate, neopentyl glycol dimethacrylate, triethylene glycol dimethacrylate, N,N'-isovalerylidene-bis-methacrylamide, N,N'-methylene-bis-methacrylamide and the like.

These Group A Cationic Polymers possess good solubility, can be made to have high molecular weights and can be used over a wide temperature range in viscosified acid solutions in subterranean formations.

The Group B Anionic Polymers

The Group B anionic polymers are the copolymers represented by Generic Formula B. They are produced by copolymerizing three or more of the monomers:

(i) an acrylamidoalkyl sulfonic acid or a methacrylamidoalkyl sulfonic acid or the salts thereof;
(ii) acrylamide, N-alkylacrylamide or N,N-dialkylacrylamide;
(iii) a hydrophobic acrylic acid ester or methacrylic acid ester or acrylamidohydrocarbyl wherein the hydrocarbyl group is as defined by R" in Generic Formula B; and
(iv) a polyunsaturated monomer.

GENERIC FORMULA B

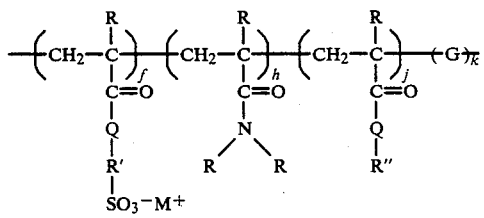

where
R=H or CH$_3$;
R'=a linear or branched alkylene or arylene radical having from 2 to 10 carbon atoms, preferably from 2 to 6 carbon atoms, most preferably from 2 to 4 carbon atoms;
M$^+$=H$^+$, Na$^+$, NH$_4^+$, or other monovalent metal atom (Me$^+$);
G=a unit derived from a polyunsaturated monomer;
Q=a divalent radical such as —O—, —NR—;
R"=C$_4$-C$_{18}$ alkyl, C$_7$-C$_{24}$ aralkyl or an ethoxylated C$_7$-C$_{24}$ aralkyl;
f=from about 10 to 60 mole percent, preferably from 20 to 50 mole percent;
h=from about 39.99 to 89.99 mole percent, preferably from 49.9 to 79.9 mole percent;
j=from 0.01 to 10 mole percent, preferably from 0.1 to about 2 mole percent; and
k=from 0 to 2 mole percent, preferably from 0.1 to 0.5 mole percent.

Illustrative type (i) monomers include sodium 2-acrylamido-2-methylpropane sulfonate, sodium 2-acrylamidoethane sulfonate, potassium 3-methacrylamidopropane sulfonate, ammonium p-acrylamidobenzenesulfonate, potassium 6-acrylamidonaphthalene sulfonate, disodium 4-methacrylamidobenzenedisulfonate-1,3, tripotassium 3-acrylamidonaphthalene trisulfonate-1,5,6, and the like.

Illustrative type (ii) monomers include acrylamide, N-methylacrylamide, N,N-dimethylacrylamide, alpha-methylacrylamide, alpha-methyl-N-methacrylamide, alpha-methyl-N,N-dimethylacrylamide.

Illustrative type (iii) hydrophobic monomers include N-butylacrylamide, N-t-butyl-acrylamide, N-decylacrylamide, N-stearylacrylamide, the N-pentylacrylamides, N-butylmethacrylamide, N-decylmethacrylamide, N-benzylacrylamide, N-tolylacrylamide, N-benzylmethacrylamide, N-tolylmethacrylamide, N-t-butylmethacrylamide, the butyl acrylates, the decyl acrylates, phenyl acrylate, tolyl acrylate, t-butyl methacrylate, octyl methacrylate, phenyl methacrylate, nonylphenoxypoly(ethyleneoxy)ethylmethacrylate, and the like.

Illustrative type (iv) polyunsaturated monomers include ethylene glycol diacrylate, diethylene glycol diacrylate, propylene glycol diacrylate, ethylene glycol dimethacrylate, diethylene glycol dimethacrylate, diurethane dimethacrylate, 1,4-butandiol dimethacrylate, polyglycol-400 dimethacrylate, neopentylglycol dimethacrylate, triethyleneglycoldimethacrylate, N,N'-isovalerylidene-bis-methacrylamide, N,N'-methylene-bis-methylacrylamide, and the like.

It was unexpected and unpredictable to discover that the viscosifying ability of the Group B Anionic Polymers was enhanced rather than impaired by the incorporation of the hydrophobic component and that even a weak hydrophobe, such as a C$_4$-alkyl moiety benefited the acid-solution viscosity. These polymers also exhibited good solubility in acid.

Applicants do not intend to be bound by the above theoretical explanation. The viscosifying ability of the hydrophobe-modified anionic polymers was found to be better than the counterpart hydrophobe free polymer. Theoretically this may be explained as being caused by an association of the hydrophobe group.

The Group C Amphoteric Polymers

The Group C amphoteric polymers are those represented by Generic Formulas C and D. These polyampholyte copolymers are particularly useful acid viscosifiers in acid solutions used where a high degree of tolerance to calcium ions is required. During the course of an acidizing operation an increasingly higher concentration of calcium chloride generally forms due to the reaction of hydrochloric acid with limestone or dolemite formations. The presence of high concentrations of calcium ions is usually detrimental to the stability of many polyelectrolytes leading to either a loss of solution viscosity or polymer precipitation or both. We have found these polyampholytes provide the required solubility and stability in acid solution and as shown in the data below are stable in the presence of calcium.

The Generic Formula C polymers are produced by copolymerizing three or more of the monomers;
(i) a cationic polymerizable monomer;
(ii) an anionic polymerizable monomer;
(iii) a hydrophobic acrylic acid ester or methacrylic acid ester or acrylamidohydrocarbyl wherein the hydrocarbyl group is as defined by R";
(iv) acrylamide; and
(v) a polyunsaturated monomer.

The Generic Formula D polymers are produced by copolymerizing at least three of the monomers;
(i) a Zwitter-ion polymerizable monomer;

(ii) a hydrophobic acrylic acid ester or methacrylic acid ester or acrylamidohydrocarbyl wherein the hydrocarbyl group is as defined by R";
(iii) acrylamide; and
(iv) a polyunsaturated monomer.

GENERIC FORMULA C

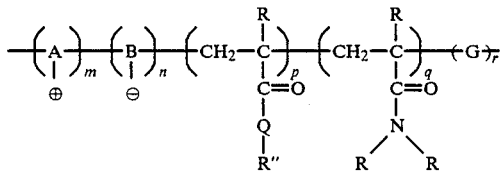

GENERIC FORMULA D

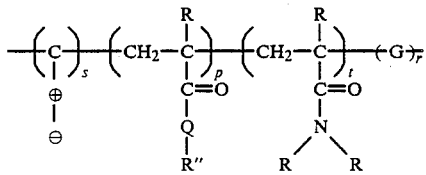

where
A—⊕ = the residue of a cationic monomer;
B—⊖ = the residue of an anionic monomer;
C—⊕—⊖ = the residue of a Zwitter-ion monomer;
R, R", Q and G are the same as previously defined from Generic Formula B;
m = 10–49.99 mole percent; preferably 20–35 mole percent;
n = 10–49.99 mole percent, preferably 20–35 mole percent;
p = 0.01–10 mole percent; preferably 0.1–2 mole percent;
q = 0–80 mole percent, preferably 30–60 mole percent;
r = 0–2 mole percent, preferably 0–0.5 mole percent;
s = 5–99.99 mole percent, preferably 10–50 mole percent; and
t = 0–95 mole percent, preferably 50–90 mole percent
with the proviso that the sum thereof equals 100 mole percent.

Of course one can use a mixture of A—⊕, B—⊖ and C—⊕—⊖ type monomers in a single copolymer and this is considered with the scope of our claimed invention. In such instances, the copolymers can be represented by the following formula wherein the variable x is modified to produce an appropriate viscosifying agent.

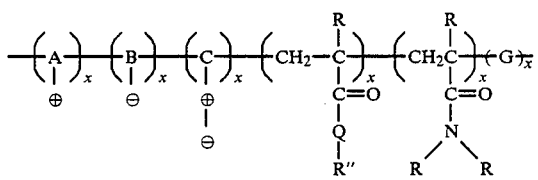

The cationic, anionic and Zwitter-ion monomers are well known to the ordinary skilled polymer chemist; any suitable monomer can be used.

Illustrative suitable cationic polymerizable monomers include dimethyldiallylammonium chloride, methacryloylethyl trimethylammonium chloride, acryloylethyl trimethylammonium methylsulfate, methacryloylethyldimethylethylammonium ethyl sulfate, methacrylamidopropyltrimethylammonium chloride, vinylmethylpyridinium chloride, and the like.

Illustrative suitable anionic polymerizable monomers include sodium 2-acrylamido-2-methylpropane sulfonic acid, sodium acrylate, potassium methacrylate, sodium 2-acrylamidoethane sulfonate, potassium 3-methacrylamidopropane sulfonate, and the like.

The cationic and anionic monomers may be present in the form of an ion-pair such that no other counter ions are present. The ion-pair monomers would enter the polymerization as if they were a single entity. Illustrative ion-pair monomers include dimethylaminopropylmethacrylamide, and 2-acrylamido-2-methylpropane sulfonic acid and the like.

Illustrative suitable Zwitter-ion polymerizable monomers include N-(3-sulfopropyl)-N-methacrylamidopropyl-N,N-dimethyl ammonium betain, N-(3-sulfopropyl)-N-methacryloxyethyl-N,N-dimethylammonium betain, and the like.

The suitable hydrophobic monomers and polyunsaturated monomers are those set forth as illustrative for types (iii) and (iv) for Generic Formula B. Illustrative type (iii) hydrophobic monomers include N-butylacrylamide, N-t-butylacrylamide, N-decylacrylamide, N-stearylacrylamide, the N-pentylacrylamides, N-butylmethacrylamide, N-decylmethacrylamide, N-benzylacrylamide, N-tolylacrylamide, N-benzylmethacrylamide, N-tolylmethacrylamide, N-t-butylmethacrylamide, the butyl acrylates, the decyl acrylates, phenyl acrylate, tolyl acrylate, t-butyl methacrylate, octyl methacrylate, phenyl methacrylate, nonylphenoxypoly(ethyleneoxy)ethylmethacrylate. Illustrative type (iv) monomers include ethylene glycol diacrylate, diethylene glycol diacrylate, propylene glycol diacrylate, ethylene glycol dimethacrylate, diethylene glycol dimethacrylate, diurethane dimethacrylate, 1,4-butandiol dimethacrylate, polyglycol-400 dimethacrylate, neopentyl glycol dimethacrylate, triethylene glycol dimethacrylate, N,N'-isovalerylidene-bis-methacrylamide, N,N'-methylene-bis-methacrylamide, and the like.

It is recognized that small amounts of other polymerizable monomers can be present in any polymer discussed above.

The polymerization reactions for producing the above polymers can be carried out using any of the methods known in the art. For example as disclosed in U.S. Pat. No. 4,191,657 (B. L. Swanson), U.S. Pat. No. 4,452,940 (M. R. Rosen), U.S. Pat. No. 4,485,209 (Y. L. Fan et al.), U.S. Pat. No. 4,529,782 (Y. L. Fan et al.) and South African Patent No. 84-01784 (Y. L. Fan et al.). The preferred method, however, is that which was used to produce the polymers in the examples.

In a typical polymerization process the method comprises;
(a) combining the monomers, an oil-soluble surfactant, water and hydrophobic liquid medium in the conventional manner;
(b) homogenizing the mixture from (a) to form a water-in-oil emulsion;
(c) deoxygenating the emulsion from (b);
(d) adding initiator(s) to the deoxygenatd emulsion from (c);

(e) heating and stirring the mixture from (d) under polymerization conditions so as to form a water-in-oil polymer emulsion; and (f) recovering the polymer in whatever physical form desired.

In this procedure, the aqueous phase generally comprises from about 60 weight percent to about 85 weight percent, preferably from about 70 weight percent to about 80 weight percent, of the total composition.

The hydrophobic medium suitable for use in this invention includes benzene, xylene, toluene, mineral oils, petroleum and mixtures thereof. A preferred hydrophobic medium is Isopar ® M. Any oil-soluble surfactant that supports a water-in-oil emulsion and does not have an unduly harmful effect on the polymerization reaction can be used. The preferred surfactants are those having a Hydrophile-Lipophile Balance (HLB) of from about 1 to about 10, preferably from about 2 to about 6. These surfactants are well known and include the fatty acid esters, and as sorbitan monolaurate, sorbitan monostearate, sorbitan monooleate, sorbitan trioleate; mono- and diglycerides, such as those obtained from the glycerolysis of edible fats; polyoxyethyleneated fatty acid esters, such as polyoxyethylene-(4)-sorbitan monostearate; polyoxyethyleneated linear alcohols, such as TERGITOL ® 15-S-3 and TERGITOL ®-25-L-3; polyoxyethylene sorbitol esters, such as polyoxyethylene sorbitol beeswax derivatives; polyoxyethyleneated alcohols, such as polyoxyethylene-(2)-cetyl ether; polyester ether copolymers (e.g. Rapisol ® B-246, ICI); and the like, or mixtures thereof.

Any of the known free radical initiators can be used at catalytic amounts sufficient to carry out the polymerization, generally from about 0.05 to about 0.5, preferably from about 0.1 to about 0.25 weight percent, based on the weight of monomers charged. The initiator can be added directly or diluted with solvent and can be incrementally added during the course of the reaction if desired. Illustrative initiators include the peroxides, such as t-butyl hydroperoxide, t-butyl perbenzoate, benzoyl peroxide, ammonium persulfate, cumene hydroperoxide; the azo compounds, such as VAZO ® 33, VAZO 52, VAZO ® 64; redox catalysts; and others known to those of ordinary skill in the art.

The polymerization is carried out at a temperature from about 30° C. to about 80° C., preferably from about 40° C. to about 60° C. The time will vary depending upon the particular reactants being employed, the temperature, the size of the batch and other conditions prevalent during the polymerization. Normally cooling is required.

The pressure is not critical and can be subatmospheric, atmospheric or superatmospheric. The polymerization is preferably carried out under an inert atmosphere. However, at times, small quantities of air or oxygen may be sparged into the reaction mixture to assist in controlling the polymerization reaction rate; the amount of dissolved oxygen in the aqueous phase is usually less than about 1 part per million.

After the polymerization is complete, an antioxidant, or any other desired additive, can be added to the reaction mass, generally in an amount of from about 0.05 to about 5 parts per hundred parts of resin. Any organic antioxidant suitable for the product can be used; it is generally added in the form of a solution in a suitable solvent. Suitable antioxidants include substituted phenols, such as Ionol; thiobisphenols, such as Santonox R ®; hydroquinone derivatives, such as the monomethyl ether of hydroquinone; benzothiazole; ammonium or sodium thiosulfate; alkaline metal thiocyanates; aminocarboxylic acids; or any of the other antioxidants known to those skilled in the art.

An inverting surfactant, e.g. TERGITOL ® NP10, may be added to the water-in-oil emulsion at the conclusion of the reaction. The surfactants which may be used include polyoxyethylene alkyl phenol, polyoxyethylene (10 mole) cetyl ether, polyoxyethylene alkyl-aryl ether, quaternary ammonium derivatives, potassium oleate, N-cetyl N-ethyl morpholinium ethosulfate, sodium lauryl sulfate, condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amines with five, or more, ethylene oxide units; ethylene oxide condensation products of polyhydric alcohol partial higher fatty esters, and their inner anhydrides (mannitolanhydride, called Mannitan, and sorbitol-anhydride, called Sorbitan). The preferred surfactants are ethoxylated nonyl phenols, ethoxylated nonyl phenol formaldehyde resins, and the like.

The inverting surfactant is used in amounts of from about 0.1 to about 20, preferably from about 1 to about 10 parts per one hundred parts of the polymer.

The water-in-oil emulsion containing the inverting surfactant is solubilized or inverted in the presence of water. The polymer-containing emulsion releases the polymer in the aqueous solution in a very short period of time.

The polymers of this invention have reduced viscosity of from about 1 dl/g to about 20 dl/g, preferably from about 3 dl/g to about 15 dl/g in 1N NaCl solution at 25° C.

The acidizing solutions generally are based on aqueous hydrochloric acid. The acid concentration usually varies from about 3 to about 28 weight percent HCl. The amount of viscosifying agent of this invention present in the acidizing solution will depend upon the viscosity desired. Suitable polymer concentrations are from about 0.25 to about 3 weight percent of the acidizing solution. Commonly about 0.5 to 1.5 weight percent is employed. The preparation of these solutions is well known to one of ordinary skill in this art and can contain any of the additives normally and conventionally used in this art. Any of the other commonly used acids can be employed, e.g., hydrofluoric acid, formic acid, acetic acid, etc., as is known in the art, as well as mixtures. It is also known that higher concentrations of the acid can be used and these are within the scope of our invention. Any concentration of acidizing acid adequate to have an acidizing effect in the formation can be used.

The following examples serve to give specific illustrations of this invention but they are not intended in any way to limit the scope of this invention.

EXAMPLE 1

Into a one-liter pyrex ® glass reactor, equipped with a turbine agitator, thermometer, addition funnel, condenser, nitrogen inlet and outlet, and an external heating or cooling bath, there was charged 704 g of a monomeric water-in-oil emulsion. The latter was prepared by emulsifying an aqueous solution that consisted of 245.2 g of a 50% aqueous solution of (MAPTAC) methacrylamidopropyltrimethylammonium chloride, 184.4 g of a 50% aqueous solution of (AM) acrylamide, 106.8 g of deionized water, and 0.17 g of Versenex ® 80 with an oil solution consisting of 157.9 g of Isopar ® M oil and 9.5 g of Span 80 ® (sorbitan monooleate). The monomeric emulsion was deaerated by sparging with nitrogen for 30 minutes. Thereafter, an initiator solution consisting of 0.012 g of VAZO ® 33 and 1.5 g of xylene was introduced. The reactor was heated to 50° C. with the external heating bath. Once the polymerization initiated, an external cooling bath was employed and the polymerization temperature was maintained at 50°±2° C. In the meantime, a second initiator solution consisted of 0.18 g of VAZO ® 52 and 7.5 g of xylene was added in six equal portions with a 10 minute interval between additions. Upon completing the addition of the second initiator, the polymerization mixture was heated for an additional 4 hours at 50°±2° C. At the end of polymerization, the reactor was cooled to room temperature and a solution of 0.2 g of Santonox ® in 2.5 g of xylene together with 10.7 g of TERGITOL ® NP10 was added to the mixture. The finished polymeric emulsion was milky white in appearance and exhibited a Brookfield viscosity of 1560 cps (Model HBT, 10 rpm at 25° C.). The recovered polymer possessed a reduced viscosity in 1N NaCl solution of 9.7 dl/g.

EXAMPLES 2-9

Using the equipment and procedure described in Example 1, a series of (MAPTAC-AM) copolymers having different degrees of ionic characters was prepared. The compositions and general characteristics of these polymers are listed in Table I. For completion; data for Example 1 is also included.

TABLE I

| CATIONIC POLYMERS DERIVED FROM MAPTAC | | | |
|---|---|---|---|
| | Composition, Mole % | | $RV^1$ | 0.3% Solution$^2$ |
| Example | MAPTAC | AM | dl/g | Viscosity, cps |
| 2 | 17.6 | 82.4 | 6.2 | 4650 |
| 3 | 20 | 80 | 10.4 | 7550 |
| 4 | 25 | 75 | 11.0 | 7250 |
| 1 | 30 | 70 | 9.7 | 5450 |
| 5 | 35 | 65 | 9.5 | 5800 |
| 6 | 40 | 60 | 7.9 | 2850 |
| 7 | 40 | 60 | 9.1 | 5800 |
| 8 | 50 | 50 | 7.6 | 3160 |
| 9 | 100 | — | 1.1 | low |

$^1$Measured in 1N NaCl solution at 25° C., C = 0.0126 g/dl.
$^2$Measured in distilled water, Brookfield Viscometer Model LVT, 0.6 rpm, at 25° C.

EXAMPLE 10

This example illustrates a general procedure for the preparation of a hydrophobe-modified cationic monomer using an alkylating agent. Into a 100-ml, 3-necked pyrex flask, equipped with a mechanic stirrer, thermometer, condenser, addition funnel and an external cooling bath, there was charged 34.7 g of the amino monomer, dimethylaminopropylmethacrylamide (DMAPMA). The flask was cooled to about 10° C. with the cooling bath, and 29.9 g of n-octyl chloride was added in a dropwise manner over a one-hour period. The reaction mixture was stirred for another hour at room temperature. The product, methacrylamidopropyldimethyl-n-octylammonium chloride, was used for polymerization without further purification.

EXAMPLES 11 and 12

Using the equipment and procedures described in Example 10 and the appropriate molar quantities of reactants, two additional hydrophobe-modified cationic monomers were prepared. The results of Examples 10 to 12 are summarized in Table II.

TABLE II

| HYDROPHOBE-MODIFIED CATIONIC MONOMERS | | | |
|---|---|---|---|
| Example Number | Amino Monomer | Alkylating Agent | Product |
| 10 | DMAPMA | n-octyl chloride | methacrylamidopropyl-dimethyl-n-octyl-ammonium chloride |
| 11 | DMAPMA | n-dodecyl chloride | methacrylamidopropyl-dimethyl-n-dodecyl-ammonium chloride |
| 12 | DMAPMA | cetyl chloride | methacrylamidopropyl-dimethylcetylammonium-chloride |

EXAMPLE 13

A polymer was prepared using the equipment and procedure described in Example 1 with the exception that the aqueous solution was composed of 245.3 g of a 50% aqueous solution of MAPTAC, 185.7 g of a 50% aqueous solution of acrylamide, 1.19 g of methacrylamidopropyldimethyl-n-octylammonium chloride prepared in Example 10, 0.18 g of Versenex ® 80, and 104.2 g of deionized water. The finished polymeric emulsion exhibited a Brookfield viscosity of 1560 cps (Model HBT, 10 rpm at 25° C.). The recovered polymer possessed a reduced viscosity of 8.1 dl/g in 1N NaCl solution at 25° C.

EXAMPLES 14 and 15

Using the procedure described in Example 13, a (MAPTAC-AM-methacrylamidopropyldimethyl-n-dodecylammonium chloride) terpolymer and a (MAPTAC-AM-methacrylamidopropyldimethylcetylammonium chloride) terpolymer were prepared. The compositions and general characteristics of the polymers are shown in Table III.

TABLE III

| HYDROPHOBE-MODIFIED CATIONIC MONOMERS | | | | |
|---|---|---|---|---|
| Example Number | Composition, Mole % | | | $RV^2$ dl/g | 0.3% Solution$^3$ Viscosity, cps |
| | Hydrophobe$^1$ | MAPTAC | AM | | |
| 13 | 0.2 (Example 10) | 29.8 | 70 | 8.1 | 900 |
| 14 | 0.2 (Example 11) | 29.8 | 70 | 8.4 | 2500 |
| 15 | 0.2 (Example 12) | 29.8 | 70 | 8.6 | 950 |

$^1$As indicated by the Example number
$^2$Measured in 1N NaCl solution at 25° C., C = 0.0125 g/dl.
$^3$Measured in distilled water at 25° C. with a Brookfield Model LVT Viscometer at 0.6 rpm.

EXAMPLE 16

A polymer was prepared using the equipment and procedure described in Example 1 with the exception that the aqueous solution was composed of 243.1 g of a 50% aqueous solution of MAPTAC, 181.6 g of a 50% aqueous solution of acrylamide, 1.4 g of the monomeric product prepared in Example 11, 1.1 g of ethylene dimethacrylate, 0.18 g of Versenex ® 80, and 109.2 g of deionized water. The finished polymeric emulsion was milky white in appearance and exhibited a Brookfield viscosity of 3760 cps. The recovered polymer possessed a reduced viscosity of 1.3 dl/g in 1N NaCl solution at 25° C. This tetrapolymer contained 0.3 mole % of the difunctional monomer-ethylene glycol dimethacrylate.

EXAMPLES 17–26

The viscosifying efficiencies of these polymers in 15% aqueous HCl solution were measured with a Fann 35 viscometer (Fann Instrument Co., Houston, Texas) at 300 rpm and 25° C. at a concentration of 35 gallons of emulsion per 1000 gallons of acid fluid (equivalent to 1.05% by weight of active polymer in the acid solution). The higher the viscosity, the more efficient is the polymer. For comparative purposes a commercially available copolymer of acrylamide and sodium acrylate was tested in the same manner (Control A). The improved properties obtained with the viscosifying polymers of this invention are clearly evident.

TABLE IV

| | | VISCOSIFYING EFFICIENCIES IN 15% HCl SOLUTION | | | |
|---|---|---|---|---|---|
| Example | Polymer of Example | Mole % MAPTAC | AM | Other | Initial Viscosity in 15% HCl, cps |
| 17 | 2 | 17.6 | 82.4 | — | 51 |
| 18 | 3 | 20 | 80 | — | 82 |
| 19 | 4 | 25 | 75 | — | 71 |
| 20 | 1 | 30 | 70 | — | 64 |
| 21 | 5 | 35 | 65 | — | 59 |
| 22 | 6 | 40 | 60 | — | 49 |
| 23 | 8 | 50 | 50 | — | 56 |
| 24 | 13 | 29.8 | 70 | 0.2 | 42 |
| 25 | 14 | 29.8 | 70 | 0.2 | 42 |
| 26 | 15 | 29.8 | 70 | 0.2 | 42 |
| Control A | | | | | 3 |

EXAMPLES 27–33

The thermal-thinning behavior, or viscosity retention at elevated temperatures, of these polymers was measured with a Fann 50 viscometer. The sample was subjected to a constant shear rate of 170 sec$^{-1}$ and was heated at a programmed rate of 12° F./min. Viscosity retention values at 225°, 250° and 300° F. were expressed in Table V as % of 100° F. viscosity. In all cases studied, the polymers of the present invention showed significantly greater viscosity retentions at elevated temperatures when compared to Control B. Control B used a commercially available polacrylamide of the type employed by drillers.

TABLE V

| | | VISCOSITY RETENTION AT ELEVATED TEMPERATURES IN 15% HCl SOLUTION | | | | | |
|---|---|---|---|---|---|---|---|
| Example No. | Polymer of Example No. | T° F. | Retention of | T° F. | Retention of | T° F. | Retention of |
| 27 | 2 | 225 | 31.3 | 250 | 42.5 | — | — |
| 28 | 3 | 225 | 30.4 | 250 | 34.1 | 300 | 32.9 |
| 29 | 4 | 225 | 39.4 | 250 | 51.5 | — | — |
| 30 | 1 | 225 | 41.7 | 250 | 47.9 | 300 | 58.3 |
| 31 | 5 | 225 | 40.5 | 250 | 48.6 | 300 | 50.0 |
| 32 | 7 | 225 | 47.6 | 250 | 44.4 | 300 | 46.8 |
| 33 | 8 | 225 | 52.9 | 250 | 50.0 | 300 | 39.4 |
| Control B | A commericial polyacrylamide | 225 | 17.6 | 250 | 6.8 | 300 | 1 |

EXAMPLE 34

Into a one-liter pyrex glass reactor, equipped with a turbine agitator, thermometer, addition funnel, condenser, nitrogen inlet and outlet, and an external heating or cooling bath, there was charged 708 g of a water-in-oil monomers emulsion. The latter was prepared by emulsifying, with a Waring blender, an aqueous solution consisting of 249.8 g of a 50% aqueous solution of sodium 2-acrylamido-2-methylpropane sulfonate (NaAMPS ®), 178.8 g of a 50% aqueous solution of acrylamide (AM), 1.9 g of N-decylacrylamide, 0.17 g of Versenex ® 80 and 105.8 g of deionized water with an oil solution composed of 157.8 g of Isopar ® M solvent and 14.2 g of Span ® 80 surfactant (sorbitan monooleate). The monomeric emulsion was deaerated by sparging with nitrogen for 30 minutes. Thereafter, an initiator solution consisting of 0.012 g of VAZO ® 33 (2,2'-azobis-[2,4-dimethyl-4-methoxy valeronitrile]) and 1.5 g of xylene was introduced. The reactor was heated to 50° C. Once the polymerization initiated, an external cooling bath was used to maintain the reactor temperature at 50°±2° C. In the meantime, a second initiator solution, consisting of 0.18 g of VAZO ® 52 (2,2'-azobis-[2,4-dimethyl valeronitrile]) and 7.5 g of xylene, was added in six equal portions with a 10-minute interval between additions. Upon completion of the addition of the second initiator, the polymerization was heated for 4 more hours at 50°±2° C. At the end of polymerization, the reactor was cooled to room temperature and a solution of 0.19 g of Santonox ® in 2.5 g of xylene, together with 10.8 g of TERGITOL ® NP10 surfactant, was added to the mixture. The finished polymeric emulsion was milky white in appearance and exhibited a Brookfield viscosity of 1200 cps (Model HBT, 10 rpm at 25° C.). The recovered polymer showed a reduced viscosity of 10.8 dl/g in 1N NaCl solution at 25° C.

EXAMPLES 35–40

Using the equipment and procedure described in Example 34, six additional terpolymers containing N-decylacrylamide were prepared. The compositions and general characteristics of these polymers are listed in Table VI.

TABLE VI

ANIONIC (NaAMPS ®-AM-NDAM) TERPOLYMERS

| Example No. | Mole %[1] NaAMPS | AM | NDAM | RV[2] dl/g | 0.3% Solution[3] Viscosity, cps |
|---|---|---|---|---|---|
| 35 | 30 | 69 | 1 | 10.3 | 9000 |
| 34 | 30 | 69.5 | 0.5 | 11.7 | 7950 |
| 36 | 30 | 69.9 | 0.1 | 11.8 | 8350 |
| 37 | 40 | 59.8 | 0.2 | 10.2 | 4000 |
| 38 | 50 | 49 | 1 | 8.6 | 1800 |
| 39 | 50 | 49.5 | 0.5 | 8.8 | 1950 |
| 40 | 50 | 49.8 | 0.2 | 9.7 | 3550 |

[1]Monomer feed composition
[2]Measured in 1N NaCl solution at 25° C., C = 0.0125 g/dl.
[3]Measured in distilled water at 25° C. using a Brookfield Model LVT Viscometer at 0.6 rpm and 25° C.

EXAMPLES 41-47

Using the equipment and procedure described in Example 34, terpolymers containing different types of hydrophobes were prepared. The compositions and general characteristics of these polymers are listed in Table VII. Also included in Table VII are two (NaAMPS ®-AM) copolymer used as controls.

TABLE VII

ANIONIC NaAMPS ®-AM-HYDROPHOBE) TERPOLYMERS

| Example No. | Mole % NaAMPS ® | AM | Hydrophobe[1] | | RV[2] dl/g | 0.3% Solution[3] Viscosity, cps |
|---|---|---|---|---|---|---|
| 41 | 30 | 69.9 | NPPEM | 0.1 | 11.6 | 10800 |
| 42 | 30 | 69.5 | NPPEM | 0.5 | 8.1 | 9050 |
| 43 | 30 | 69.9 | NBMA | 0.1 | 12.4 | 9000 |
| 44 | 30 | 69.5 | NBMA | 0.5 | 11.4 | 9300 |
| 45 | 30 | 69 | NBMA | 1.0 | 11.4 | 10750 |
| 46 | 30 | 69.9 | NTBMA | 0.1 | 11.1 | 7050 |
| 47 | 30 | 69 | NTBMA | 1.0 | 11.3 | 7850 |
| Cont. C | 40 | 60 | — | | 10.4 | 6400 |
| Cont. D | 30 | 70 | — | | 10.4 | 9900 |

[1]NPPEM = Nonylphenoxypoly(ethyleneoxy)ethylmethacrylate; NBMA = N-benzylmethacrylamide; NTBMA = N-t-butylmethacrylamide.
[2]Measured in 1N NaCl solution at 25° C., C = 0.0125 g/dl.
[3]Measured in distilled water at 25° C. using a Brookfield Model LVT Viscometer at 0.6 rpm and 25° C.

EXAMPLES 48-54

Using the equipment and procedures described in Example 34, tetrapolymers containing both a hydrophobic comonomer and a multifunctional comonomer were prepared. The compositions and general characteristics of these polymers are listed in Table VIII.

TABLE VIII

ANIONIC TETRAPOLYMERS

| Example No. | Mole % NaAMPS ® | AM | Hydrophobe | Multifunctional[1] Monomer | RV[2] dl/g | 0.3% Solution[3] Viscosity, cps |
|---|---|---|---|---|---|---|
| 48 | 50 | 49.5 | NDAM 0.2 | EDMA 0.3 | 1.4 | 10800 |
| 49 | 50 | 49.2 | NDAM 0.2 | EDMA 0.6 | 0.8 | 9050 |
| 50 | 50 | 49.5 | NDAM 0.2 | EDMA 0.3 | 1.4 | 9000 |
| 51 | 50 | 49.7 | NDAM 0.2 | EDMA 0.1 | 3.3 | 9300 |
| 52[4] | 50 | 49.5 | NDAM 0.2 | EDMA 0.3 | 4.8 | 10750 |
| 53[5] | 50 | 49.5 | NDAM 0.2 | EDMA 0.3 | 1.7 | 7050 |
| 54 | 50 | 49.5 | NDAM 0.2 | TPTA 0.3 | 0.6 | 7850 |

[1]EDMA = ethylene glycol dimethacrylate; TPTA = trimethylolpropane trimethacrylate.
[2]Measured in 1N NaCl solution at 25° C., C = 0.0125 g/dl.
[3]Measured in distilled water at 25° C. using a Brookfield Model LVT Viscometer at 0.6 rpm and 25° C.
[4]EDMA added to the reactor during polymerization
[5]One percent by weight of NaCl was added to the aqueous solution.

EXAMPLES 55-60

The examples shown in Table IX illustrate the benefit of incorporating a suitable polymerizable hydrophobe monomer into an anionic acid viscosifier. In all cases studied, the N-decylacrylamide-modified polymers produced noticeably higher viscosities in acid fluid than their corresponding unmodified versions.

TABLE IX

VISCOSIFYING EFFICIENCIES IN 15% HCl SOLUTION

| Example No. | Polymer of Example No. | Mole % NaAMPS ® | AM | NDAM | Initial[1] Viscosity in 15% HCl, cps |
|---|---|---|---|---|---|
| 55 | Control D | 30 | 70 | — | 30 |
| 56 | 35 | 30 | 69 | 1 | 34 |
| 57 | 34 | 30 | 69.5 | 0.5 | 42 |
| 58 | 36 | 30 | 69.9 | 0.1 | 39 |
| 59 | Control C | 40 | 60 | — | 23 |
| 60 | 38 | 40 | 59.8 | 0.2 | 30 |

[1]Measured with a Fann 35 Viscometer (Fann Instrument Co., Houston, Texas) at room temperature and 300 rpm and a concentration of 1.05% by weight of polymer.

EXAMPLES 61-68

The examples shown in Table X further illustrate the benefit of this invention with different types of hydrophobic comonomers.

TABLE X
VISCOSIFYING EFFICIENCIES IN 15% HCl SOLUTION

| Example No. | Polymer of Example No. | Mole % NaAMPS ® | AM | Hydrophobe | | Initial[1] Viscosity in 15% HCl, cps |
|---|---|---|---|---|---|---|
| 61 | Control D | 30 | 70 | — | | 30 |
| 62 | 41 | 30 | 69.9 | NPPEM | 0.1 | 58 |
| 63 | 42 | 30 | 69.5 | NPPEM | 0.5 | 47 |
| 64 | 43 | 30 | 69.9 | NBMA | 0.1 | 39 |
| 65 | 44 | 30 | 69.5 | NBMA | 0.5 | 44 |
| 66 | 45 | 30 | 69.0 | NBMA | 0.1 | 45 |
| 67 | 46 | 30 | 69.9 | NTBMA | 0.1 | 37 |
| 68 | 47 | 30 | 69.0 | NTBMA | 1.0 | 37 |

[1]Measured with a Fann 35 Viscometer at room temperature and 300 rpm and a concentration of 1.05% by weight of polymer.

The data in Tables IX and X show the polymers of this invention, which contain the hydrophobe monomers, when used as acid viscosifiers produce acid solutions having higher initial viscosities than are obtained when using a polymer that does not contain the hydrophobe in the molecule.

EXAMPLES 69-71

The benefit of retaining a higher portion of its initial viscosity in acid fluid is accomplished by the incorporation of the multifunctional comonomers described in this patent. Data in Table XI show the viscosity retention as a function of temperature and time when the various levels of polyfunctional monomer are employed.

TABLE XI
VISCOSITY RETENTION OF ANIONIC ACID VISCOSIFIERS CONTAINING DIFFERENT LEVELS OF EDMA

| | Example No. | | | |
|---|---|---|---|---|
| | 40 | 51 | 50 | 49 |
| EDMA, Mole % | — | 0.1 | 0.3 | 0.6 |
| Initial Viscosity[1] at 100° F., cps | 48 | 23 | 28 | 11 |
| Retained[1,2] Viscosity, % | | | | |
| at 150° F. | 75 | 67 | 72 | 42 |
| at 200° F. | 56 | 43 | 53 | 36 |
| at 225° F. | 47 | 37 | 53 | 32 |
| at 250° F. | 38 | 40 | 65 | 29 |
| at 250° F. + 5 min. | 38 | 57 | 116 | 57 |
| at 250° F. + 15 min. | — | — | 222 | 217 |
| at 250° F. + 30 min. | — | — | — | 629 |
| after cooling[1] back to 100° F. | 78 | 113 | 250 | >1000 |

[1]Measured at a polymer concentration of 2.1% by weight using a Fann 50 Viscometer at 100 rpm.
[2]Viscosity at 100° F. = 100%.

EXAMPLE 72

Into a one-liter pyrex ® glass reactor, equipped with a turbine agitator, thermometer, addition funnel, condenser, nitrogen inlet and outlet, and an external heating or cooling bath, there was charged about 700 g of a water-in-oil monomeric emulsion. The latter was prepared by emulsifying, with a Waring blender, an aqueous solution consisting of 162.4 g of sodium 2-acrylamido-2-methylpropane sulfonate as the anionic monomer, 92 g of a 62% aqueous solution of dimethyldiallylammonium chloride as the cationic monomer, 150.3 g of a 50% aqueous solution of acrylamide as the water soluble monomer, 1.4 g of nonylphenoxypoly(ethyleneoxy)ethylmethacrylate as the hydrophobic monomer, 0.14 g of Versenex ® 80, and 130.2 g of deionized water with an oil solution composed of 157.8 g of Isopar ® M solvent and 9.5 g of Span ® 80 surfactant (sorbitan monooleate). The monomeric emulsion was deaerated by nitrogen sparging for 30 minutes. Thereafter, an initiator solution consisting of 0.012 g of VAZO ® 33 (2,2'-azobis[2,4-dimethyl-4-methoxy valeronitrile]) and 1.5 g of xylene was introduced. The reactor was heated to 50° C. Once the polymerization initiated, an external cooling bath was used to maintain the reactor temperature at 50°±2° C. In the meantime, a second initiator solution consisting of 0.18 g of VAZO ® 52 (2,2'-azobis[2,4-dimethyl valeronitrile]) and 7.5 g of xylene was added in six equal portions with a 10-minute interval between additions. Upon completion of the addition of the second initiator, the polymerization was heated for 4 more hours at 50°±2° C. At the end of the polymerization, the reactor was cooled to room temperature and a solution of 0.19 g of Santonox ® R in 2.5 g of xylene together with 10.8 g of TERGITOL ® NP10 surfactant was added to the mixture. The finished polymeric emulsion was milky white in appearance and exhibited a Brookfield viscosity of 880 cps (Model HBT, 10 rpm at 25° C.). The recovered polymer possessed a reduced viscosity of 6.2 dl/g in 1N NaCl solution.

EXAMPLE 73

A polymer was prepared using the equipment and procedures described in Example 72, with the exception that the aqueous solution consisted of 163.4 g of a 50% aqueous solution of sodium 2-acrylamido-2-methylpropane sulfonate as the anionic monomer, 92.5 g of a 62% aqueous solution of (DMDAAC) dimethyldiallylammonium chloride as the cationic monomer, 151.5 g of a 50% aqueous solution of acrylamide as the water soluble monomer, 0.14 g of Versenex ® 80, and 128.9 g of deionized water. The finished polymeric emulsion exhibited a Brookfield viscosity of 1500 cps (Model HBT, 10 rpm at 25° C.). The recovered polymer possessed a reduced viscosity of 7.6 dl/g in 1N NaCl solution at 25° C.

EXAMPLE 74

An acid fluid containing 1.05 g of active polymer of Example 72 in 15% HCl was heated in a 180° F. water bath for 60 minutes. The acid fluid showed no visible polymeric precipitate. Reaction with limestone showed no significant change in viscosity nor any evidence of precipation. Under the same testing conditions, either the corresponding (NaAMPS ®-AM) copolymer (at 20/80 molar ratio) or (DMDAAC-AM) copolymer (at 20/80 molar ratio) resulted in precipitation of the polymer on heating.

EXAMPLE 75

An acid fluid containing 1.05 g of active polymer of Example 72 in 15% HCl produced a solution viscosity of 40 cps (Fann 35 viscometer measured at 300 rpm and 25° C.). A control fluid made with the same amount of polymer of Example 73 gave a solution viscosity of 34 cps.

EXAMPLE 76

Using the equipment and general procedures described in Example 72, a copolymer composed of 30 mole percent of N-(3-sulfopropyl)-N-methacrylamido-propyl-N,N-dimethylammonium-betain (SPP) and 70 mole percent of acrylamide was prepared. The resultant polymeric emulsion exhibited a Brookfield viscosity of 1,400 cps. The recovered polymer possessed a reduced viscosity (RV) of 7.5 dl/g in 1N NaCl solution at 25° C.

EXAMPLE 77

Example 76 was repeated with the exception that a small amount of a hydrophobic comonomer, nonyl-phenoxy-poly(ethyleneoxy)ethylmethacrylate (NPPEM), was incorporated into the polymerization formulation so that the resultant product was a (NPPEM-SPP-AM) terpolymer containing 0.1, 30, and 69.9 mole percent of these monomers, respectively. The resultant polymeric emulsion exhibited a Brookfield viscosity of 1,600 cps. The recovered polymer possessed a reduced viscosity of 6.7 dl/g.

EXAMPLE 78

The thermal-thinning behavior in 15% HCl 77 solution of the polymers prepared in Example 76 and were measured using a Fann 50 viscometer operating at 100 rpm and a programmed heating rate of 12° F./min. A polymer concentration of 1.05 weight percent was employed.

| Polymer of Example | RV | Initial Viscosity at 100° F., cps | % Retention of 100° F. Viscosity at | | | |
|---|---|---|---|---|---|---|
| | | | 150° | 200° | 250° | 300° |
| 76 | 7.5 | 51 | 72 | 43 | 23 | 9 |
| 77 | 6.9 | 67 | 82 | 50 | 34 | 27 |

The polymer in Example 77, which contained a small amount of hydrophobic monomer NPPEM, produced a significantly higher degrees of viscosity retention at elevated temperatures than its corresponding polymer without the hydrophobic comonomer indicating it was more stable to heat.

What we claim is:

1. A cationic polymer of the formula:

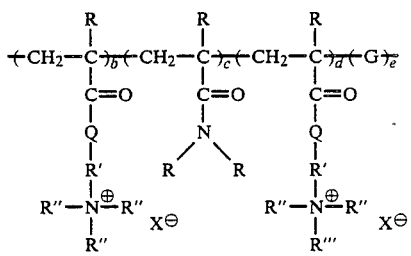

wherein:
R=H or CH$_3$;
R'=a linear or branched alkylene radical having from 2 to 4 carbon atoms;
R''=H, CH$_3$ or CH$_2$CH$_3$;
R'''=an alkyl group, linear or branched, having from 8 to about 18 carbon atoms;
Q=—NR— or —O—;
G=a residual unit derived from a polyunsaturated monomer;
X$^\ominus$=a halogen ion (F, Cl, Br, I) or an alkyl sulfate ion;
b=from about 30 to about 50 mole percent;
c=from about 50 to about 70 mole percent;
d=from 0.1 to about 2 mole percent; and
e=from 0 to 0.5 mole percent.

2. A cationic polymer A as claimed in claim 1 comprising (i) methacrylamidopropyl-trimethylammonium chloride; (ii) acrylamide and (iii) methacrylamido-propyldimethyl-C$_{8-16}$-ammonium chloride units.

3. A cationic polymer as claimed in claim 2 wherein component (iii) is methacrylamidopropyldimethyl-n-stearyl-ammonium chloride units.

4. A cationic polymer as claimed in claim 2 wherein component (iii) is methacrylamidopropyldimethyl-cetylammonium chloride units.

5. A cationic polymer as claimed in claim 2 wherein component (iii) is methacrylamidopropyldimethyl-n-dodecylammonium chloride units.

6. A cationic polymer as claimed in claim 1 comprising (i) methacrylamidopropyltrimethylammonium chloride, (ii) acrylamide, (iii) methacrylamidopropyl-dimethyl-n-dodecylammonium chloride and (iv) ethyleneglycol dimethacrylate units.

7. A cationic polymer as claimed in claim 2 wherein component (iii) is methacrylamidopropyldimethyl-n-octyl-ammonium chloride units.

* * * * *